March 21, 1950    P. P. RYAN    2,501,540
INSULATED DRIP BAFFLE
Filed June 3, 1947    3 Sheets-Sheet 3
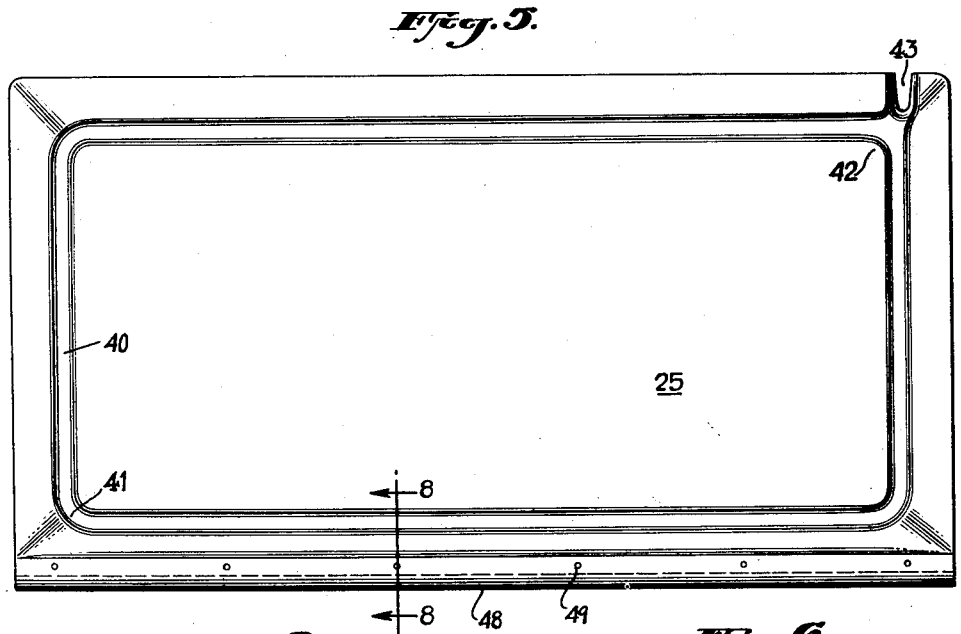
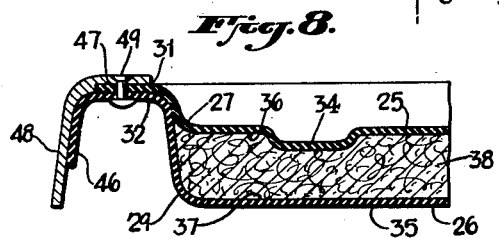
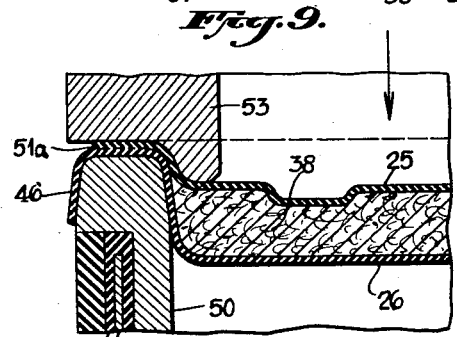
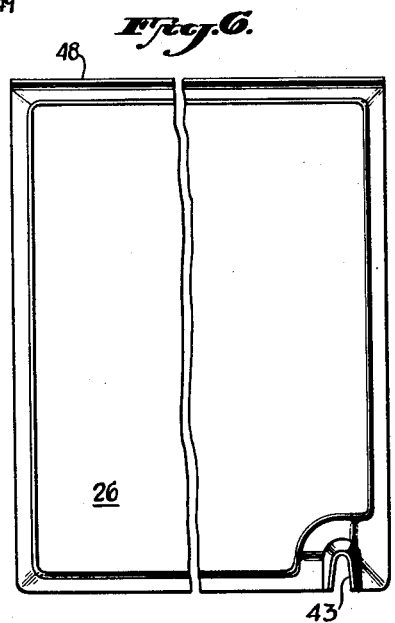
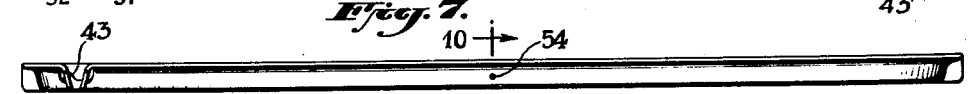
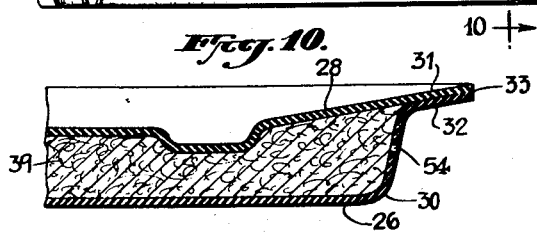
INVENTOR.
PATRICK P. RYAN.
BY Ward, Curly & Neal
ATTORNEYS.

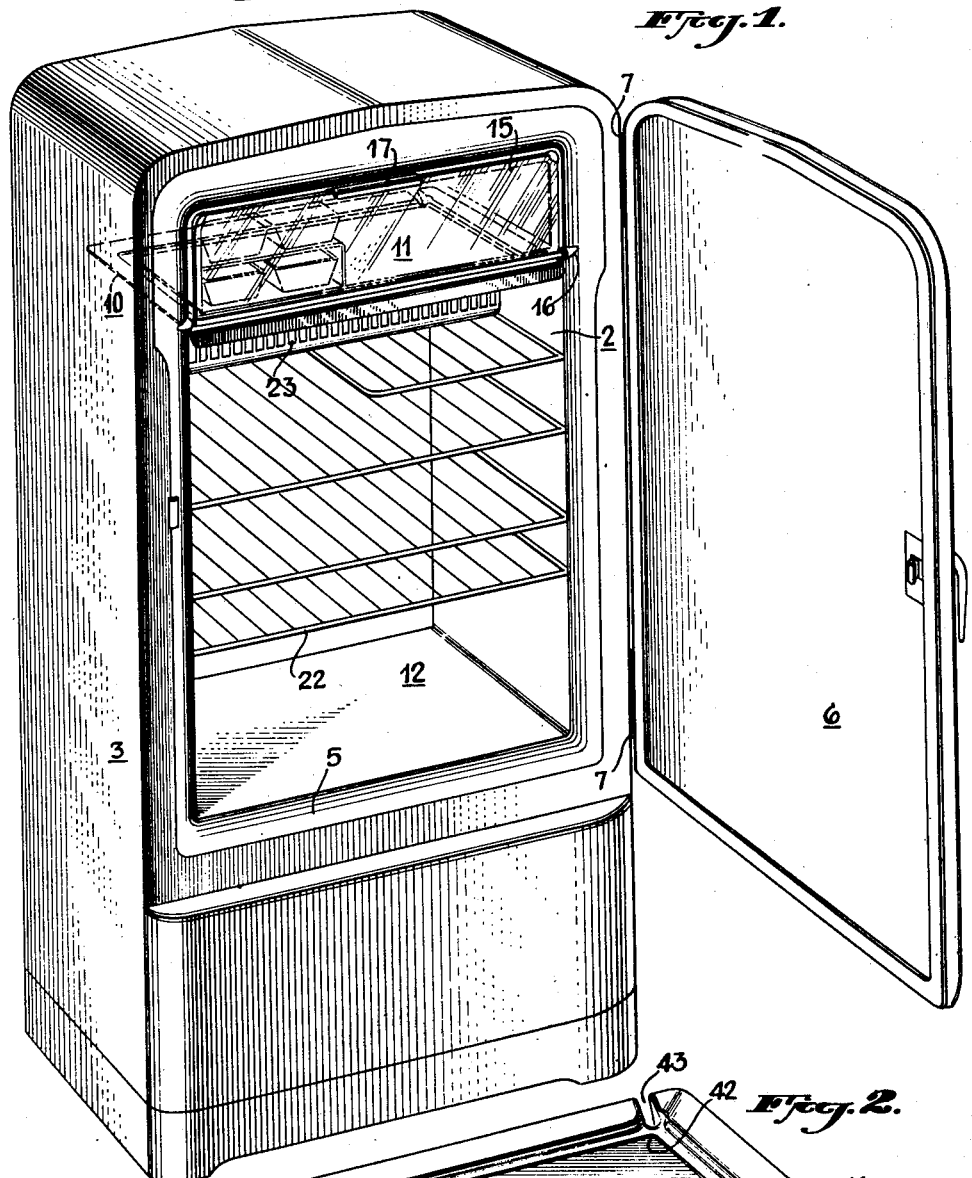
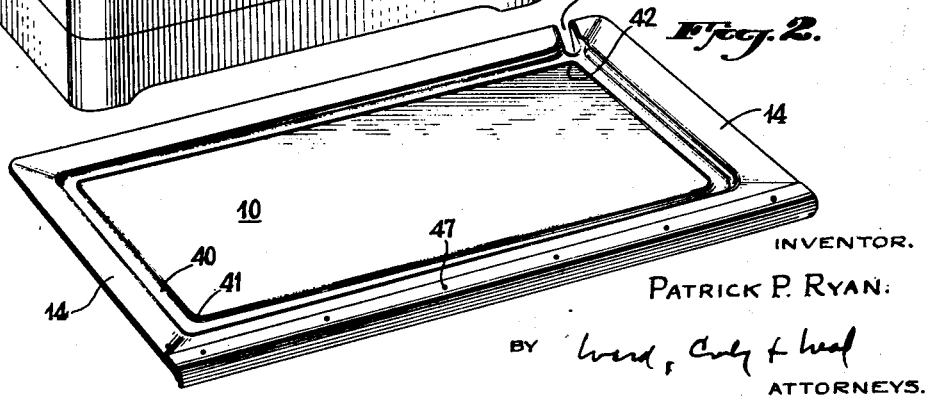

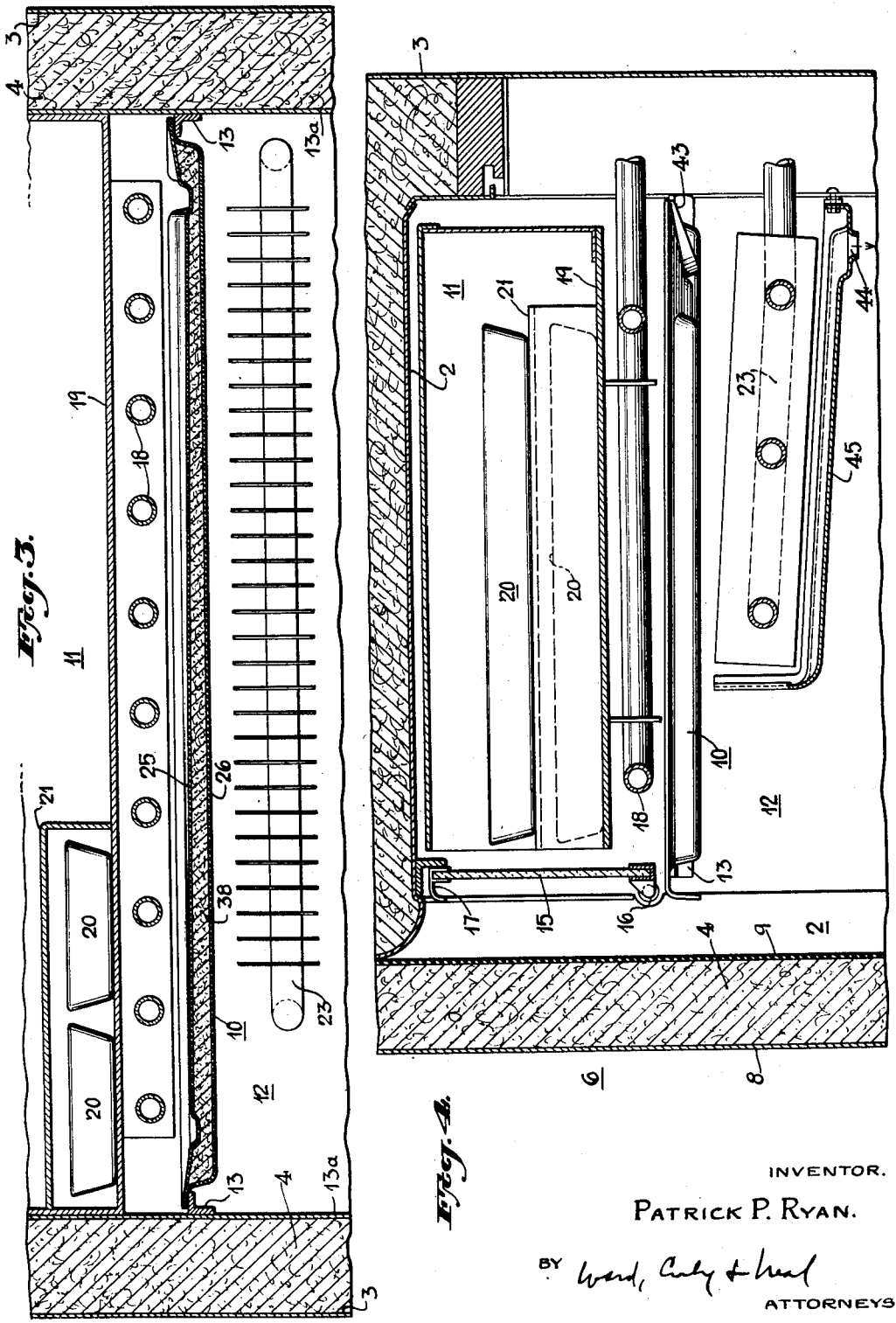

Patented Mar. 21, 1950

2,501,540

UNITED STATES PATENT OFFICE 2,501,540

INSULATED DRIP BAFFLE

Patrick P. Ryan, Trenton, N. J., assignor to St. Regis Paper Company, New York, N. Y., a corporation of New York Application June 3, 1947, Serial No. 752,227

5 Claims. (Cl. 312—171)

This invention pertains to automatic refrigerator units, and more particularly to such as embody in the refrigerator cabinet, separate frozen food and cold storage food compartments, which are thermally insulated from one another by suitable thermal insulating baffle members or partitions. The invention pertains more especially to the aforesaid baffle or partition member, and to refrigerator cabinets incorporating the same.

Automatic refrigerators are coming increasingly into vogue for household use, which are provided with an upper, relatively low temperature compartment for the storage of frozen foods, and a lower and somewhat higher temperature compartment for the cold storage of fresh foods. Considerable difficulty has been encountered in the past in devising a suitable thermally insulating partition between the upper or frozen food compartment and the lower or cold storage compartment of the refrigerator cabinet. Partitions of this character have been made in the past of spaced sheet metal members having a thermal insulating material, such as rock wool, ground cork or the like, interposed therebetween, together with thermal insulating breaker strips of a laminated plastic material or the like for facing the peripheral edges of the sheet metal members and appropriately spacing the same. Such constructions are not only expensive and cumbersome, but deteriorate rapidly in use.

In accordance with the present invention, I propose to provide a partition member for purposes aforesaid, made in the form of a drip baffle of unitary construction, which may be easily removed for purposes of cleaning. The partition member or drip baffle of my invention comprises a built-up structure consisting preferably of a pair of relatively stiff and rigid, preformed panels and made of a thermoset resin, laminated plastic material, one of said panels being deeply recessed and the other of said panels being slightly recessed, said panels having complementary peripheral portions fitting together with said slightly recessed panel stacked in said deeply recessed panel, said peripheral portions being permanently bonded together in a fluid-tight joint under the application of combined heat and pressure by means of an interposed thermosetting resinous adhesive, thereby to provide an integral structure having a slightly recessed upper surface and a completely sealed-in and fluid-tight hollow interior. In addition, the slightly recessed upper surface is preferably provided with a recessed groove terminating in a drain outlet, for draining off moisture or other liquids condensing on the upper surface of the baffle or partition. Also, the sealed-in hollow interior of the structure is preferably filled with a loosely packed thermal insulating material, such as rock wool, ground cork or the like.

In order successfully to produce a thermal insulating laminated plastic baffle or partition of the character aforesaid, it is necessary to employ a laminated plastic material which will not blister or mar under the application of the combined heat and pressure required for permanently bonding the peripheral edges of the upper and lower panel members in the manner aforesaid. In addition, since it is generally desired to apply to such a laminated plastic structure, a baked-on enamel coating or finish corresponding to that applied to the inner and outer metal cabinets of the refrigerator proper, a laminated plastic material must be employed which will not mar or blister during the baking-on of this enamel finish, which is ordinarily carried out at temperatures on the order of 300 to 350° F.

A suitable laminated plastic material for this purpose is described in United States Letters Patent No. 2,415,763, granted February 11, 1947, to Patrick P. Ryan. This heat-resisting and non-blistering laminated plastic material is composed of superimposed layers of fibrous sheet material, such as paper or the like, impregnated with and consolidated by a thermoset synthetic resin, such as a phenol formaldehyde resin, and characterized in that one surface sheet of the laminate is relatively high in resin content for providing a relatively smooth, hard and imporous surface, adapted for reception, without blistering, of the baked-on enamel coating, the remainder of the laminate including the body portion and the opposite surface sheet thereof, being relatively low in resin content and sufficiently porous to permit the escape therethrough of gases evolved on heating.

In accordance with the preferred embodiment of my invention, I make my novel baffle or partition member of this heat-resisting laminated plastic material, whereby the peripheral edges of the upper and lower panels may be sealed together under heat and pressure without producing blistering of the laminate, and whereby a baked-on enamel coating may be subsequently applied without surface marring, blistering or other injury to the baffle or partition member. To this end, the upper and lower panel members of the baffle or partition are shaped from this heat-resisting laminated plastic material in such fashion that the outer or exposed surface comprises, in each instance, the surface layer of high resin content, while the body and inner or non-exposed surfaces of the material are relatively low in resin content and hence sufficiently porous to permit the escape of gases evolved on heating as aforesaid. Since, with this arrangement, gases will be evolved into the hollow interior of the panel during the heat and pressure sealing of the peripheral edges, and also during the subsequent baking-on of the enamel finish, it is necessary to provide a small opening through one of the panel members into the hollow interior, approximately of pin-hole dimensions, to permit these evolved gases to escape into the outer atmosphere. However, after the edge-sealing and baking operations are completed, this pin-hole opening is permanently sealed up with a plug of a plastic thermosetting resin, so that in the final structure the hollow interior is completely sealed off from the outer atmosphere in a fluid-tight manner.

In the drawings:

Fig. 1 is a perspective view of an automatic refrigerator incorporating a laminated plastic drip baffle or thermally insulating partition, in accordance with a preferred embodiment of the invention.

Fig. 2 is a perspective view from above, of the baffle or partition member.

Fig. 3 is a transverse vertical section through the portion of the Fig. 1 modification which includes the baffle; while Fig. 4 is a corresponding longitudinal vertical section.

Fig. 5 illustrates the baffle of Fig. 2 in plan view from above; while Fig. 6 is a plan view from below.

Fig. 7 is a side elevation of the baffle as viewed from the rear in Fig. 1.

Fig. 8 is an enlarged partial section at 8—8 of Fig. 5.

Fig. 9 is a partial section, similar to Fig. 8, but illustrative of the manner in which the upper and lower panels of the baffle are integrally bonded together by hot-pressing.

Fig. 10 is an enlarged partial section at 10—10 of Fig. 7.

Referring to the drawings, and more particularly to Figs. 1 to 4, there is shown an automatic refrigerator 1 comprising a substantially rectangular, inner sheet metal chamber 2 and corresponding outer sheet metal housing 3, mounted in spaced relation as shown in Figs. 3 and 4, with the space therebetween filled with an appropriate thermal insulating material 4, such as rock wool or the like. The chamber and housing are open on one side, namely, at the front as shown in Fig. 1, the space between the inner sheet metal chamber 2 and outer sheet metal housing 3 being spanned or faced with a thermally insulating breaker frame 5 of laminated plastic or the like, thereby to provide a suitable opening into the chamber 2, which is normally closed by a door 6, as in Fig. 4, the door being suitably hinged to the housing 3, as at 7. As shown in Fig. 4, the door is of standard, thermally insulating construction, comprising an outer sheet metal panel 8 and an inner panel 9, preferably of a thermally insulating material such as a laminated plastic, these panels being spaced apart except for their abutting peripheral edges, with the space in between filled with the aforesaid thermal insulating material 4.

Extending transversely across the upper portion of chamber 2 is the above-mentioned, laminated plastic drip baffle or partition member 10, which subdivides the chamber into upper and lower compartments 11 and 12. The baffle member which will be described more in detail below, is of relatively flat and substantially rectangular configuration, as illustrated in Fig. 2, and is supported in the refrigerator chamber 2 on angle members 13 secured to the chamber walls 13a, these angle members in turn engaging the lateral edges 14 of the baffle. The baffle 10 is not secured to the angles 13, but merely rests thereon so that it may be slidably removed for cleaning, etc., and similarly replaced.

The upper refrigerator compartment 11 formed by the baffle 10 is provided at the front with a closure panel 15, made preferably of a transparent thermal insulating material, such as a clear synthetic resin, for example, polystyrene, Lucite, etc. Panel 11 is hinged, at its lower edge, to the breaker frame 5, as at 16, and has secured to its upper edge a gripping device 17, whereby the panel may be swung downwardly to open.

By virtue of the thermally insulating panel 15 and baffle 10, the upper compartment 11 is effectively isolated thermally from the lower compartment 12. The upper compartment 11 is intended as a frozen food storage chamber, and to this end is provided with cooling coils 18 disposed beneath a sheet metal shelf 19, for supporting the comestibles as well as ice cube trays or the like 20. A second shelf 21 supported on the shelf 19 provides a means for supporting additional ice cube trays or the like, as illustrated in Fig. 1.

The lower compartment 12 is intended for the storage on shelves, such as 22, of fresh foods, vegetables, meats, milk, etc., and is provided with a separate cooling unit 23 for maintaining in chamber 12 a somewhat higher temperature than that of the frozen food chamber 11.

Referring now more especially to Figs. 3 and 5 to 10 inc. the drip baffle 10 comprises upper and lower panels 25 and 26 composed preferably of laminated plastic material of the character aforesaid. The upper panel is preferably slightly recessed, as at 27, 28, Figs. 8 and 10, while the lower panel is more deeply recessed, as at 29. These panels are provided respectively with complementary peripheral portions 31, 32 fitting together in stacked assembly, as illustrated in Figs. 8 and 10, and integrally bonded together, as by means of a thermoset synthetic resin adhesive to provide a fluid-tight joint or junction 33.

As stated, the panels 25 and 26 are made of a laminated plastic material in accordance with said Ryan Patent 2,415,763, composed of superimposed layers of fibrous sheet material, such as kraft paper, impregnated with and consolidated under heat and pressure by a thermoset synthetic resin, such as a phenol formaldehyde resin. The exposed surface sheet of each panel laminate, i. e., surfaces 34 and 35, Fig. 8, are relatively high in resin content for providing relatively smooth, hard and imporous surfaces adapted for reception of a baked-on enamel coating, while the remaining body portion and inner surface sheet 36, 37 of each panel laminate is relatively low in resin content and sufficiently porous to permit the escape therethrough of gases evolved on heating, whereby a baked-on enamel coating may be applied to the exposed surfaces 34, 35 without blistering or marring the laminate. Since such an enamel coating must be baked-on at temperatures upwards of 300 to 350° F., conventional laminated plastic materials are not suitable inasmuch as they will severely blister or rupture at such temperatures. Similarly, the bonding together of the peripheral edges 31, 32 of the panel laminates under the combined action of heat and pressure, as described below, would blister and destroy conventional laminates.

The lower panel member 26 is more deeply recessed than the upper panel member 25 as explained, in order to provide a hollow interior or space between the stacked panels except along their peripheral portions. Prior to assembling the panels and bonding their peripheral portions together, a layer or mat made of thermal insulating material, such as rock wool 38, is placed in the lower panel.

The upper panel is preferably provided with a peripheral groove 40, which gradually increases in depth in passing from one corner 41 to the opposite corner 42, at which point a slotted drain outlet 43 is provided. In this way, moisture or liquids accumulating on the upper panel, as for example, during defrosting, are automatically drained off and flow through the slotted opening 43 and down through a second slotted opening 44, Fig. 4, provided in a container 45, under the lower cooling unit 18. The liquid flowing through these openings may be accumulated in a suitable removable glass or like container, positioned on one of the shelves 22, Fig. 1, below the opening 44, and thus emptied from time to time.

If desired, the front edge of the lower panel may be provided with a downwardly extending lip, as at 46, Fig. 8, and the panels may be tapped or drilled, as at 47, Figs. 2 and 8, for attaching a metal face plate 48 thereto, as by means of rivets 49.

The panel members 25 and 26 may be made in the manner described in said Ryan patent, by superimposing sheets of thermosetting resin varnish impregnated paper to the appropriate resin content aforesaid, and thereupon hot-pressing in molds conforming to the configurations of said panels until the stacked sheets are consolidated and the resin content converted from the thermosetting to the thermoset state. The upper and lower panels are then edge-trimmed in the usual manner and assembled in a press, such as is illustrated in Fig. 9, and in the manner shown therein for bonding their edges together. This press comprises a lower metal supporting member 50 conforming in shape to the peripheral underside of panel 26 as shown, member 50 being heated by an electrical resistance coil 51, suitably encased in an insulating material, as at 52. Cooperating with the supporting member 50 of the press is a cooperating piston-actuated, vertically displaceable member 53, having a lower surface configuration corresponding to the upper peripheral surface contour of panel 25, as shown.

The finished baffle member 10 is produced by first applying to the upper peripheral surface 51a, Fig. 8, thereof, a coating of a suitable thermosetting resinous adhesive, such for example as a hot-setting phenol formaldehyde resin. With the plunger 53 elevated, the lower panel is then placed on the press support 50 in the position shown, Fig. 8. A mat 38 of rock wool or the like is then placed in the lower panel recess, and the upper panel 25 stacked into the lower panel as shown, Fig. 8. The plunger 53 is now depressed for a brief interval to hot-press the peripheral portions 32, 33 together until the interposed resinous adhesive has been converted from the thermosetting to the thermoset state, thereby permanently to bond the panels together in a fluid-tight joint. During the hot-pressing operation, gases will be evolved into the inner cavity between the laminates which must be permitted to escape, and to this end a small opening 54, Figs. 7 and 10, is provided in one of the laminates. This hot-pressing operation results in the finished baffle member as illustrated in the drawings. At the time of assembly into the refrigerator, the baffle ordinarily receives an enamel coating, such as is applied to the inner and outer cabinets 2, 3 of the refrigerator. This enamel coating may comprise, for example, an oil-modified glyceryl phthalate resin pigmented with titanium dioxide. This is usually sprayed onto the baffle at room temperature and subsequently baked on at a temperature of about 300° F. for 30 minutes or so, during which operation the resin of the coating is converted from the thermosetting to the thermoset condition and integrally bonded to the laminate. During this baking, additional gases will be evolved in the inner cavity of the baffle which must escape through the opening 54 so that this opening must not be sealed off until the baking operation is completed. Following this, any suitable cold-setting resinous material may be plugged into the hole, whereupon a finished thermally insulating baffle is provided having a completely sealed-in hollow interior filled with a thermal insulating material.

I claim:

1. A thermal insulating member for refrigerator cabinets and the like, comprising: a built-up structure consisting of a pair of relatively stiff and rigid preformed panels of laminated plastic material, at least one of said panels being recessed and said panels having complementary peripheral portions fitted together and integrally and permanently bonded in a fluid-tight joint to provide a completely sealed-in space therebetween, said laminated plastic material comprising superimposed layers of fibrous sheet material impregnated with and consolidated by a thermoset synthetic resin, the exposed surface sheet of said material for each said panel being relatively high in resin content and providing a relatively smooth, hard and impervious surface, the remainder of said material for each panel including the body portion and the inner surface sheet thereof, being relatively low in resin content and sufficiently porous to permit the escape therethrough of gases evolved on heating, and a thermal insulating material disposed in the interior space between said panels.

2. A thermal insulating drip baffle for refrigerator cabinets and the like, comprising: a built-up structure consisting of a pair of relatively stiff and rigid preformed panels of resinous laminated plastic material, one of said panels being deeply recessed and the other of said panels being slightly recessed, said panels having complementary peripheral portions fitting together with said slightly recessed panel stacked in said deeply recessed panel, said peripheral portions being permanently bonded in a fluid-tight joint, thereby to provide an integral structure having a slightly recessed upper surface and a completely sealed-in and fluid-tight hollow interior, said slightly recessed surface having a recessed groove therein for draining off liquids condensing thereon, and a thermal insulating material disposed in said hollow interior.

3. A thermal insulating drip baffle for refrigerator cabinets and the like, comprising: a built-up structure consisting of a pair of relatively stiff and rigid preformed panels of resinous laminated plastic material, one of said panels being deeply recessed and the other of said panels being slightly recessed, said panels having complementary peripheral portions fitting together with said slightly recessed panel stacked in said deeply recessed panel, said peripheral portions being permanently bonded in a fluid-tight joint, thereby to provide an integral structure having a completely sealed-in interior space therebetween and a slightly recessed upper surface, said slightly recessed surface having a recessed groove therein for draining off liquids condensing thereon, and a thermal insulating material disposed in the interior space between said panels, said laminated plastic material comprising superimposed layers of fibrous sheet material impregnated with and consolidated by a thermoset synthetic resin, the exposed surface sheet of said material for each said panel being relatively high in resin content and providing a relatively smooth, hard and impervious surface, the remainder of said material for each panel including the body portion and the inner surface sheet thereof, being relatively low in resin content and sufficiently porous to permit the escape therethrough of gases evolved on heating.

4. A thermal insulating member for refrigerator cabinets and the like, comprising: a built-up structure consisting of a pair of relatively stiff and rigid preformed panels of resinous laminated plastic material, at least one of said panels being recessed and said panels having complementary peripheral portions fitted together and permanently bonded in a fluid-tight joint, thereby to provide an integral structure having a sealed-in interior space between said panels, said laminated plastic material comprising superimposed layers of fibrous sheet material impregnated with and consolidated by a thermoset synthetic resin, the exposed surface sheet of said material for each said panel being relatively high in resin content and providing a relatively smooth, hard and impervious surface, the remainder of said material for each said panel, including the body portion and the inner surface sheet thereof, being relatively low in resin content and sufficiently porous to permit the escape therethrough of gases evolved on heating, and a thermal insulating material disposed in said interior space between said panels.

5. A thermal insulating partition member for refrigerator cabinets and the like, comprising: a built-up structure consisting of a pair of relatively stiff and rigid, preformed panels of laminated plastic material, at least one of said panels being recessed, and said panels having complementary flanges extending peripherally thereabout, said flanges being integrally and permanently bonded together in a fluid-tight joint, by means of an interposed water-insoluble adhesive, thereby to provide a laminated plastic, shell-like structure having a completely sealed-in and fluid-tight space between said panels, a thermal insulating material disposed in said interior space, and said laminated plastic material comprising superimposed layers of fibrous sheet material impregnated with and consolidated by a thermoset synthetic resin.

PATRICK P. RYAN.

REFERENCES CITED

The following references are of record in the file of this patent:

UNITED STATES PATENTS

| Number | Name | Date |
|---|---|---|
| 2,054,323 | Holbrook | Sept. 15, 1936 |
| 2,167,442 | Alsing | July 25, 1939 |
| 2,363,530 | Iwashita | Nov. 28, 1944 |
| 2,415,763 | Ryan | Feb. 11, 1947 |
| 2,453,703 | De Carlo | Nov. 16, 1948 |